C. C. CARTER.
Grain-Drill.

No. 47,518.

Patented May 2, 1865.

Witnesses:
Mathew Sheamoji
Thos Fisch

Inventor:
C C Carter
Pr Munn & Co
Attorneys

UNITED STATES PATENT OFFICE.

CYRUS C. CARTER, OF EXETER, ILLINOIS.

IMPROVEMENT IN SEEDING-MACHINES.

Specification forming part of Letters Patent No. 47,518, dated May 2, 1865.

*To all whom it may concern:*

Be it known that I, CYRUS C. CARTER, of Exeter, in the county of Scott and State of Illinois, have invented a new and Improved Seeding-Machine; and I do hereby declare that the following is a full, clear, and exact description thereof, which will enable others skilled in the art to make and use the same, reference being had to the accompanying drawings, forming part of this specification, in which—

Figure 1:
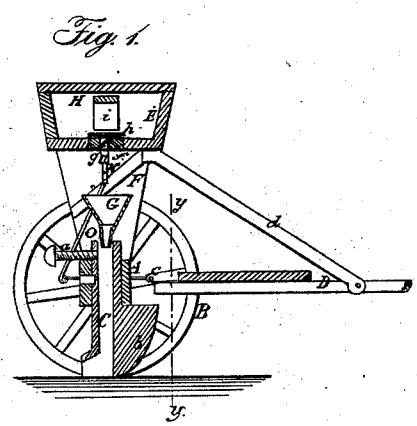
Figure 3:
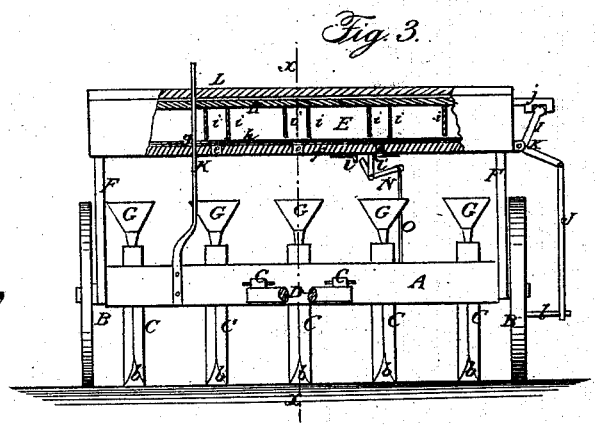
Figure 2:
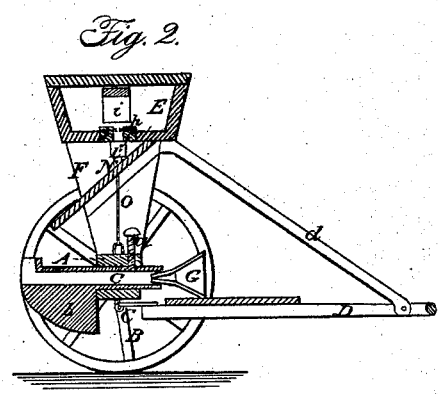

Figures 1 and 2 are transverse vertical sections of my invention, taken in the line $x\,x$, Fig. 3; Fig. 3, a front sectional view of the same, taken in the line $y\,y$, Fig. 1.

Similar letters of reference indicate like parts.

This invention relates to a new and improved machine for sowing seed broadcast and in drills; and it consists in a novel arrangement of parts, as hereinafter set forth, whereby it is believed that many advantages are obtained over the ordinary machines in use.

A represents an axle having a wheel, B, at each end of it, and C represents a series of tubes, which may be adjusted higher or lower in the axle, and secured at any desired point within the scope of their adjustment by means of set-screws $a$. These tubes convey the seed into furrows made by shares $b$ at the front sides of the tubes C, and by thus adjusting these tubes the seed may be planted at a greater or less depth, as desired.

D represents the draft-pole, which is connected by joints $c$ to the axle A; and E is a seed-box, which is supported by standards F F at the ends of the axle A, the latter being allowed to turn freely in the standards. This seed-box is connected by bars $d$ with the draft-pole D.

In the upper ends of the tubes C there are fitted funnels G, which, when the machine is adjusted for sowing seed in drills, are directly under and in line with holes $e$ in a slide, $f$, in the bottom of the seed-box E, and over this slide $f$ there is placed a metal perforated slide, $g$, which may be adjusted so that its holes may register wholly or partially with the holes in slide $f$, and a similar slide, $h$, is placed over $g$.

Directly over the slide $h$ there is a reciprocating slide, H, provided with pendent plates $i$, which extend down nearly to slide $h$. This slide H has a notch, $j$, at its under side at one end, and in this notch the upper end of a bent lever, I, is fitted, said lever having its fulcrum at $k$, and connected at its lower end by a pivot to a connecting-rod, J, which is connected by a wrist-pin, $l$, to one of the wheels B at a suitable distance from its center, to give a requisite play or vibration to the lever I, and a proper length of movement to slide H. (See Fig. 3.)

In sowing the seed in drills the funnels G are kept in a vertical position and directly underneath and in line with the holes $e$ in slide $f$, as shown in Fig. 1, by means of a spring-lever, K, which engages with a notched bar, L, attached to the seed-box.

As the machine is drawn along the pendent plates $i$ of the slide H cause the seed to be discharged with certainty through the perforations of the slides $f\,g\,h$, the seed passing into the funnels G and thence into the tubes C, which conduct it into the furrows made by the shares $b$.

In sowing seed broadcast an inclined board, M, is adjusted between the standards F F, (see Fig. 2,) the seed falling directly upon it. This board M serves as a scatterer and causes the grain to fall upon the ground in a perfect broadcast manner. In this operation the tubes C are raised above the surface of the ground.

When the machine is not required to operate—as, for instance, in drawing it from place to place—the shares $b$ are raised out of the ground by throwing the spring-lever K forward, so that the tubes C will be in a horizontal position, as shown in Fig. 2, the distribution of seed from the box E being prevented by moving the slide $f$ so that its holes $e$ will be out of line with the holes in the plates $g\,h$. This movement of slide $f$ is effected automatically, as follows: A bent lever, N, is fitted in a pendant, $j$, attached to the seed-box, one arm, $k$, of said lever being fitted between pendants $l'\,l'$, attached to the under side of slide $f$, and the other arm, $m$, connected to a rod, O, which is attached to the axle A. In throwing forward the lever K the lever N is actuated by the turning of the axle and the connection formed between said axle and lever N by rod O, and the slide $f$ is moved by means of lever N acting against one of the pendants $l'$, said lever acting against the other pendant and throwing back slide $f$, when the lever K is raised and the axle turned, so that the tubes C will have a vertical position.

I claim as new and desire to secure by Letters Patent—

1. The adjustable tubes C, fitted in the turning axle A and provided with the funnels G, in combination with the seed-box E, provided with the reciprocating slide H, having the pendent plates $i$ attached, and the perforated plates $g\ h$, all arranged to operate as set forth.

2. The combination of the adjustable tubes C, turning axle A, seed-box E, provided with the slides $f\ g\ h$, the scattering-board M, and the spring-lever K and notched bar L; all arranged substantially as set forth.

CYRUS C. CARTER.

Witnesses:
 WILLIAM W. WHITE,
 JOHN HENRY JOHNSON.